(12) United States Patent  
Schild et al.

(10) Patent No.: US 8,592,731 B2  
(45) Date of Patent: Nov. 26, 2013

(54) FLEXIBLE HEATED HOSE AND METHOD OF MANUFACTURE

(75) Inventors: German Schild, Heidelberg (DE); Gerhard Hoss, Xanten (DE)

(73) Assignee: Masterflex SE (DE)

( * ) Notice: Subject to any disclaimer, the term of this patent is extended or adjusted under 35 U.S.C. 154(b) by 660 days.

(21) Appl. No.: 12/681,148

(22) PCT Filed: Oct. 11, 2007

(86) PCT No.: PCT/US2007/081088  
§ 371 (c)(1),  
(2), (4) Date: Apr. 1, 2010

(87) PCT Pub. No.: WO2009/048470  
PCT Pub. Date: Apr. 16, 2009

(65) Prior Publication Data  
US 2010/0269917 A1   Oct. 28, 2010

(51) Int. Cl.  
*H05B 3/58* (2006.01)

(52) U.S. Cl.  
USPC .............................. 219/535; 219/534; 219/536

(58) Field of Classification Search  
USPC .................................. 219/534–536, 465–480  
See application file for complete search history.

(56) References Cited

U.S. PATENT DOCUMENTS

| | | | | |
|---|---|---|---|---|
| 5,613,524 | A * | 3/1997 | Martucci | 138/137 |
| 6,390,140 | B2 * | 5/2002 | Niki et al. | 138/127 |
| 7,687,745 | B2 * | 3/2010 | Kertesz | 219/535 |
| 2008/0298788 | A1 * | 12/2008 | Martucci et al. | 392/472 |

* cited by examiner

*Primary Examiner* — Cuong Q Nguyen  
(74) *Attorney, Agent, or Firm* — Hovey Williams LLP

(57) ABSTRACT

A heated hose includes an inner hose (109 covered by a braided support web (20) that fixes heating conductors (30) against the inner hose (10); and further including a protective jacket (40) covering.

29 Claims, 9 Drawing Sheets

FLEXIBLE HEATED HOSE AND METHOD OF MANUFACTURE

BACKGROUND

The present disclosure relates generally to a flexible heated hose, and method of manufacturing the heated hose.

TECHNICAL FIELD

In certain applications, transferred liquids and gasses (collectively referred to herein as "fluids") need to be heated. Constant and reliable heat transfer is particularly important to provide a dependable source of heated fluid. In many of these applications, it is desirable for conduits carrying these fluids to possess functional versatility. Accordingly, a need therefore exists for improvements in conduits that carry heated fluids, particularly those conduits forming heated hoses. The present invention addresses this and other needs.

SUMMARY OF THE PRESENT INVENTION

The present invention includes a heated hose having an inner hose, a braided support web encompassing the inner hose, at least one heating conductor fixed by the web against the inner hose and a solid jacket covering the fixed heating conductor and web. The present invention may also include additional components of an overlaying reinforcement braiding exterior to the solid jacket, a foam component, foil layer and/or exterior jacket.

DETAILED DESCRIPTION OF THE PREFERRED EMBODIMENT

The present invention relates to the novel design and manufacture of heated hoses. The heated hose of the present invention includes a combination of two different technical principles for electrical heating systems: (1) one or more series-resistive heating conductors producing constant wattage output independent of the ambient/product temperature to ensure continuous heat transfer and (2) combination and/or connection of the heating conductors to allow adjustment of the heat output of those conductors.

Figure 1:
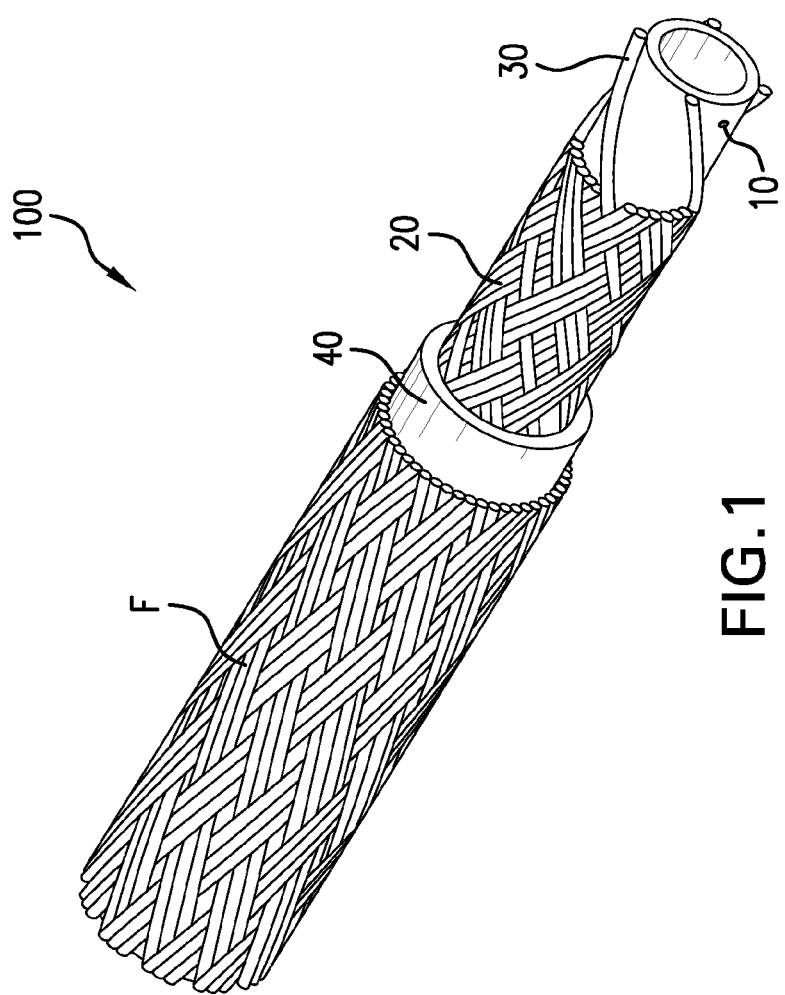
FIG. 1 is an illustration showing component parts of the heated hose of the present invention.
Figure 2:
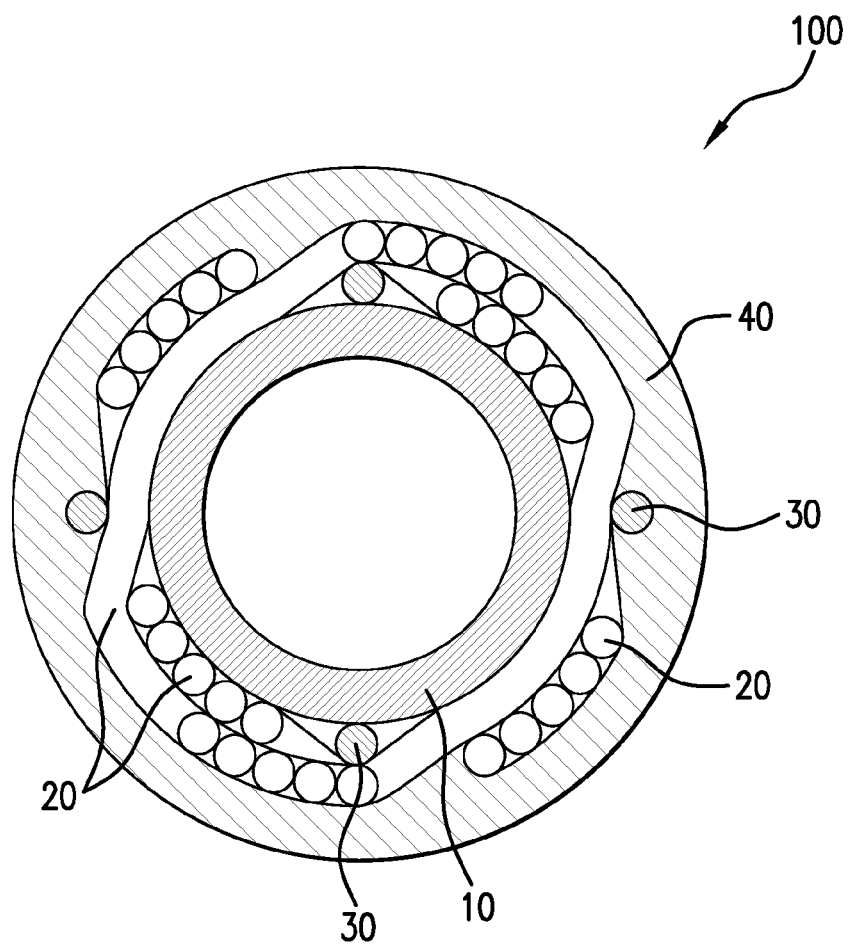
FIGS. 2-7 are illustrations showing the end view of various embodiments of the heated hose of the present invention.
Figure 3:
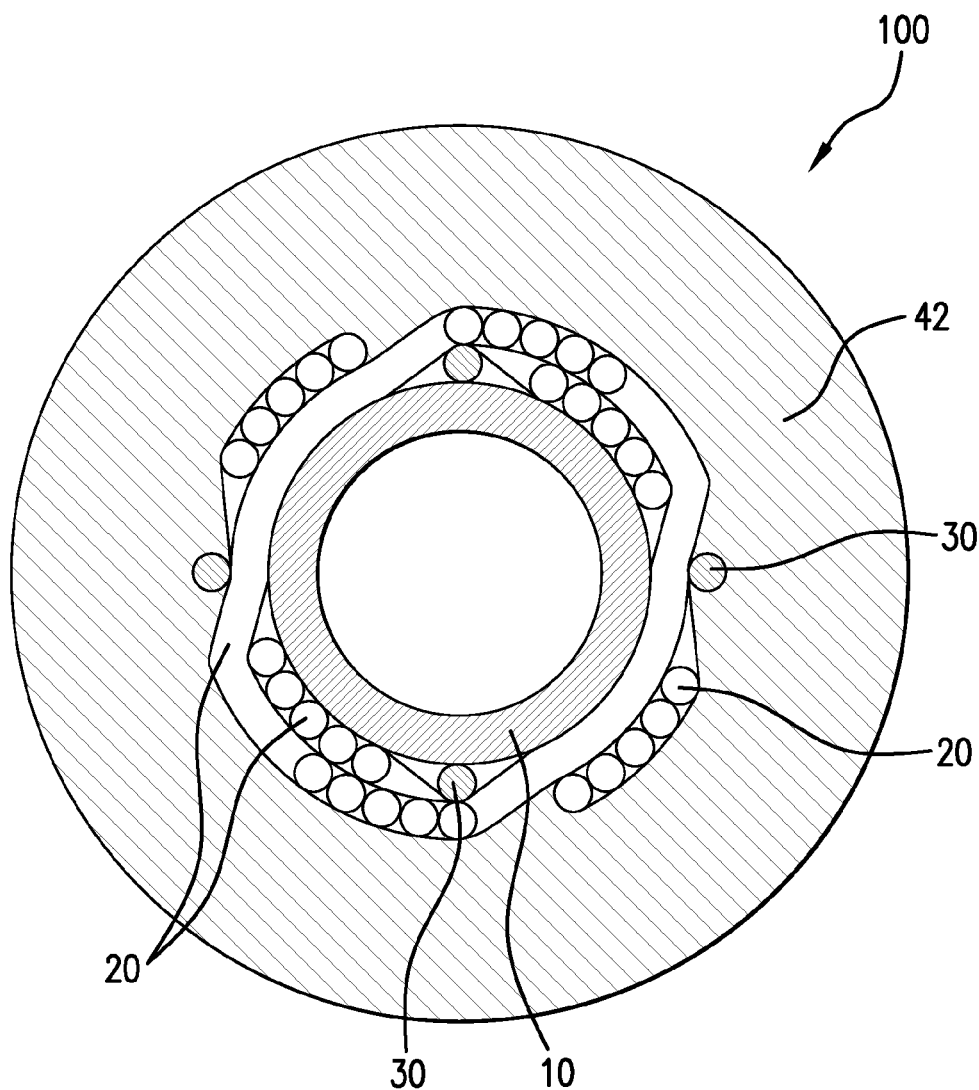
Figure 4:
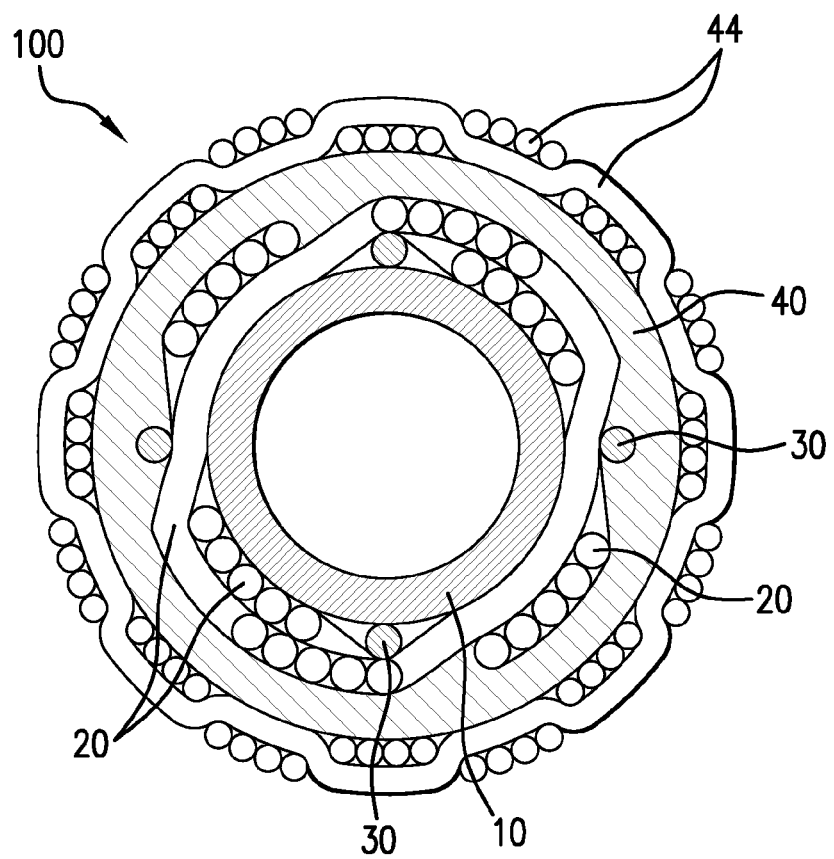
Figure 5:
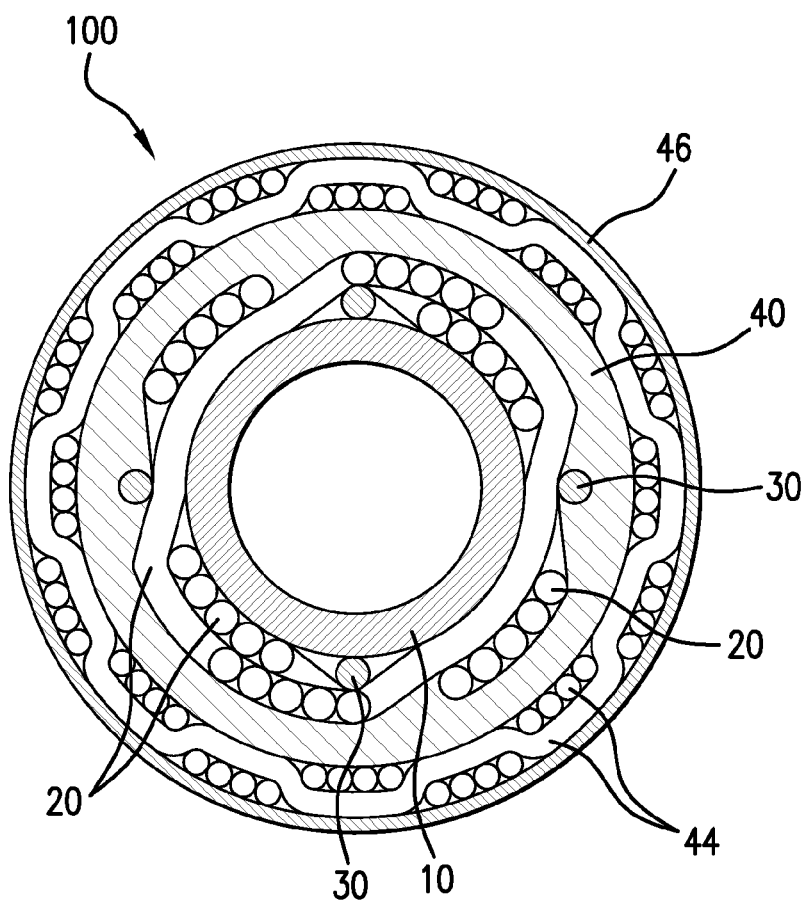
Figure 6:
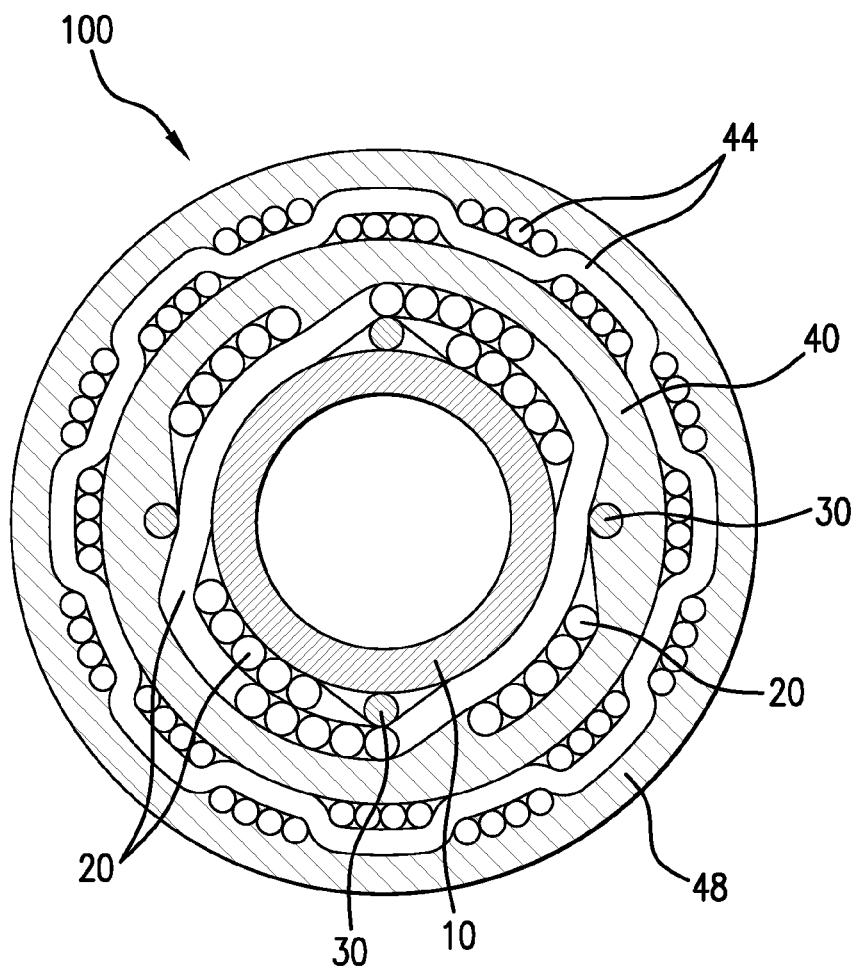
Figure 7:
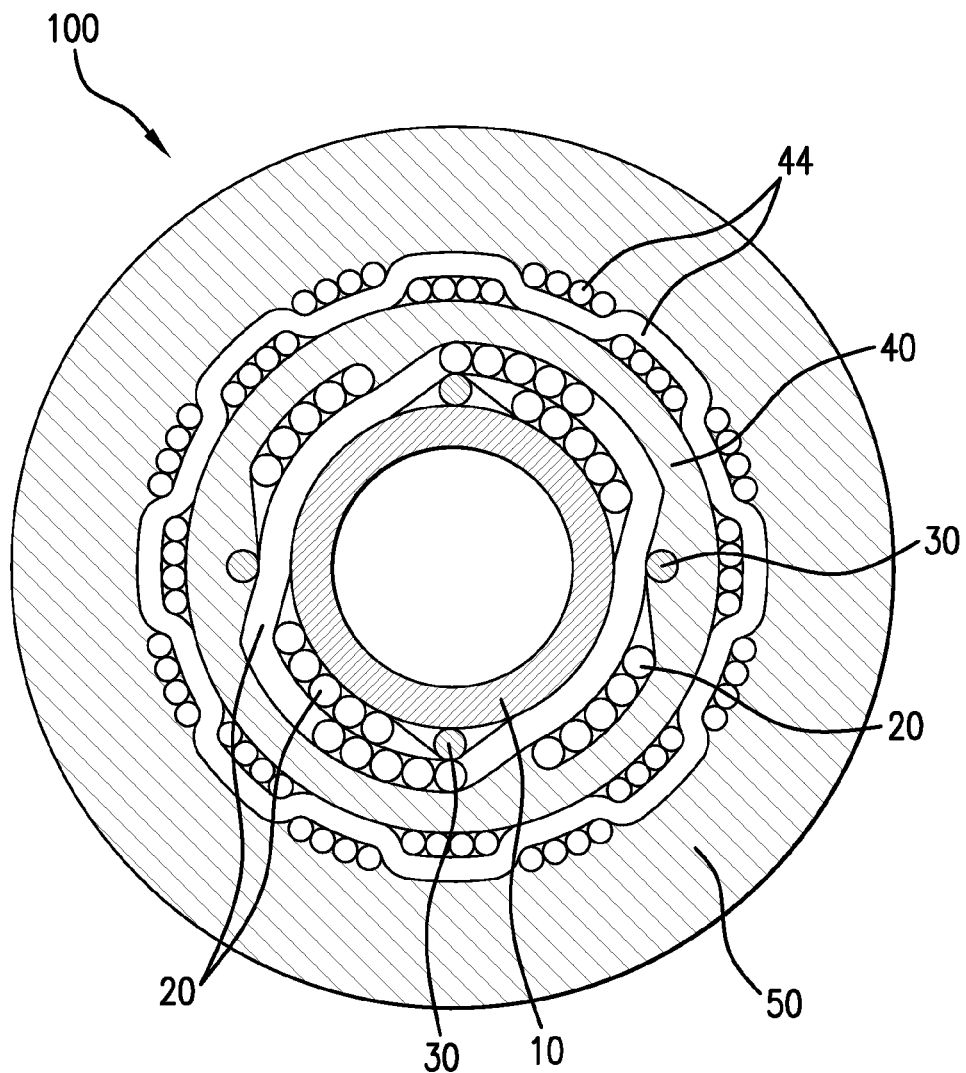

Referring to the invention illustrated in FIG. 1, a heated hose 100 has an inner hose or pipe component 10 covered by a braided support web 20 fixing a heating conductor 30 against the inner hose 10 which is overlaid with a protective jacket 40.

The inner hose 10 of the present invention preferably includes a flexible, seamless conduit. The inner hose 10 includes appropriated diameters and thicknesses for the heated hose 100 to perform a particular function, with representative diameters including, for example without limitation, a focus of from about 4 mm to about 25 mm. Representative wall thicknesses of the inner hose 10 preferably range between about 1 mm to about 2.5 mm, such as 0.8 mm, 1.0 mm, 1.5 mm, 2.0 mm and 2.5 mm. The inner hose 10 provides a sufficiently large opening for the effective transfer of a fluid therethrough, and is dimensioned for a given purpose. Cross-section of the inner hose 10 may include those dimensions and configurations appropriate for a given purpose or environment, such as circular, oval, polygonal or other like configurations, with circular passages most preferred. Selection of the appropriate cross-section of a given inner hose 10 is determinable by those skilled in the art of fluid transfers for use in a particular environment. The inner hose 10 includes those solid flexible compositions having sufficient mechanical properties, thermal stability and heat conductivity for functioning as a heated conduit of liquids and/or gases passing though the inner hose 10. Representative flexible compositions include, for example without limitation, thermoplastic elastomer (TPE) materials such as thermoplastic polyether elastomer (TPEE), thermoplastic polyurethane (TPU), thermoplastic polyolefin (TPO); vulcanized products such as thermoplastic vulcanizates (TPV); polyolefin (PO) materials such as low-density polyethylene (LDPE), high-density polyethylene (HDPE) and polypropylene (PP); fluoropolymers, such as polytetrafluoroethylene (PTFE), perfluoroalkoxy copolymer (PFA), fluorinated ethylenepropylene (FEP), ethylene chlorotrifluoroethylene copolymer (ECTFE), ethylene tetrafluoroethylene copolymer (ETFE), and polyvinylidene difluoride (PVDF); and/or silicone and combinations and mixtures thereof, or other such plastic-like and/or rubber like compositions. Of these, TPEE is most preferred.

The braided support web 20 retains at least one heating conductor 30 against the outer wall of the inner hose 10. Web design is preferably used to facilitate proper contact of the heating conductors 30 with the inner hose 10 for proper and reliable functioning of the heated hose 100. Design of the braided support web 20 may encompass such factors as maximizing the contact area between the heating conductors 30 and inner hose 10, providing maximum support of the heating conductors 30 for reliable placement, e.g., location of the heating conductors 30 at given places along the length of the inner hose 10, separation of the heating conductors 30 from each other, retention of the heating conductors 30 when the heated hose 100 is transitioned between straight and flexed modes of operation, ensuring contact of the heating conductors 30 with the inner hose 10, and other like consideration determinable by those skilled in the art of heated fluid transfers. The braided support web 20 is constructed to sufficiently encase the inner hose 10 in a manner to fix and/or otherwise locate the heating conductors 30 at appropriate locations along the length, and about the circumference, of the inner hose 10. The composition of the braid members of the braided support web 20 permits the creation of strong extended lengths to be woven into the braided support web 20 while retaining flexibility along the length of the inner hose 10. Representative compositions of the braid members includes, for example without limitation, polyester, glass fiber, carbon fibers, textile filaments, KEVLAR®, and combinations and mixtures of these compositions. Preferably, the braided support web 20 covers from about 20% to about 100% of the outer surface area of the inner hose 10, with coverage of from about 50% to about 70% of the outer surface area of the inner hose 10 more preferred.

While the braided support web 20 encompassing the inner hose 10 serves to fix one or more heating conductors 30 against the inner hose 10, it functions in a manner to allow the inner hose 10 to be operationally flexed. With the heating conductors 30 located at defined locations around the inner hose 10, the heating conductors 30 are able to provide relatively uniform and/or predictable heating of the inner hose 10 in a reliable and calculable manner, even as the inner hose 10 is bent or otherwise contorted. In one preferred embodiment, the heating conductors 30 are covered by the braided support web 20. As such, the heating conductors 30 remain in direct contact with the inner hose 10 along the entire length of the inner hose 10. Frictional contact between the braided support web 20 and heating conductors 30 retain the heating conductors 30 in contact with the inner hose 10 during use.

In a preferred alternative embodiment, the heating conductors 30 are interwoven within the braided support web 20. In this embodiment, the heating conductors 30 are fixed in place against and along the length of the inner hose 10 as a component of the braided support web 20, and as such the heating conductors 30 remain flexible within the braided support web 20 while generally not moving independently of the braided support web 20. For example, one or more heating conductors 30 are spiraled around the inner hose 10 continuously maintaining distance between the individual heating conductors 30. The braided support web 20 fixes each heating conductor 30 relative to the inner hose 10 and to other heating conductors 30 with its braids of glass fibers or other threads/fibers of various materials. As seen in the preferred embodiments shown in FIGS. 1-7, the heated hose 100 includes four separate heating conductors 30 intra-braided with the braided support web 20, positioned in north, east, south and west (N-E-S-W-) quadrants around the inner hose 10. When controlled to operate independently, these four heating conductors 30 provide increased versatility in heating the inner hose 10. As shown in the figures, the heating conductors 30 are fixed or supported with or within a braided support web 20. The four heating conductors 30 are under or interwoven within strands of polyester or glass fiber, carbon fibers, textile filaments, KEVLAR® or other non-conductive or semi-conductive fibers fixed on the surface of the pipe 10. This method of embedding the heating conductors 30 between the non-conductive strands of the braided support web 20 ensures a tight fixing of the heating conductors 30 to the outer surface of the inner hose 10 while ensuring the flexibility of the heated hose 100. By keeping the heating conductors 30 close to the surface to be heated, the present invention increases the efficiency of heat transfer to the outer surface of the inner hose 10. As such, the present invention may provide significantly lower power consumption and/or lower heater operating temperatures during operation for equivalent temperature levels inside the inner hose 10.

The heating conductors 30 preferably include strands, twisted strands, and/or solid conductors of metal, metal alloys, and semi-conductive polymers such as TPE or fluoropolymers of various profiles, e.g., round, oval and flat profiles. The resistance values depend on the conductor materials used and size of the heating conductors 30. Ranges of the resistance of the heating conductors 30 vary from that of bare copper, to that of copper alloys and to Nichrome® versions for exemplar low, medium and high resistance values.

Preferably multiple heating conductors 30 are present in a single heated hose 100. In one embodiment, different heating conductors 30 in a given heated hose 100 retain different resistances. Multiple power output settings are possible using combinations of different heating conductors 30. By employing different types and/or designs of heating conductors 30 within a particular heated hose 100, a single heated hose 100 may be used for multiple functional parameters or environments. This reduces the number of standard hoses to be stocked and increases the flexibility in creating appropriate loop resistances for the functional requirements of various applications with a reduced number of hose designs. When multiple heating conductors 30 are used, representative numbers of heating conductors 30 for a given heater hose 100 range from about 2 to about 10 heating conductors 30 present, with from about 2 to about 8 heating conductors 30 more preferred, and from about 2 to about 6 heating conductors 30 most preferred. Variability of the heating capabilities among the heating conductors 30 permits a large range of operational parameters for a single heated hose 100. The heating conductors 30 may include specifically distinct physical shapes, such as round profiles, flat profiles, and combinations thereof, and other cross-sectional geometries. Selection of a particular physical shape may be determined in consideration of the heating properties desired, the amount of contact with the inner hose 10, the heat transfer properties of the inner hose 10 and/or braided support web 20, availability of raw materials, and other such conditions determinable by those skilled in the art of heated fluid transfers. For example, within a given heated hose 100 having four heating conductors 30, each having distinct heating capabilities, conductivity and diameters, the possible thermal profiles are numerous.

The heated hose 100 may further include a variable heating conductor connector. In one embodiment, the heating conductors 30 include an electrically insulating covering. When present, this electrically insulating covering provides mechanical protection and electrical insulation. Additionally, the heated hose 100 may include a temperature sensor which is particularly useful for use in applications carrying temperature sensitive fluids or for applications in hazardous areas.

In one particularly preferred embodiment, the variable heating conductor connector is capable of selectively energizing individual heating conductors 30 within a given heated hose 100. The incorporation of two or more, preferably four or more, heating conductors 30 allows adjustment of the heat output along the pipe 10 by using different connection schemes. For example, with four heating conductors 30, the heated hose 100 may have all four heating conductors 30 in line as one element, having two sets of two conductors creating two heating elements, or using only two conductors with two as spares. As such, this enables the designer to select a limited range of heating element resistances to provide the desired heat, to have the opportunity to create long production runs of hose, and/or to implement supply voltages outside of standard network values such as 110/115V or 230/240V.

The protective jacket 40 applied to the outside of the braided support web 20 further strengthens the heated hose 100 while providing protection of the heating conductors 30 and braided support web 20 fixed against the inner hose 10. Preferably the protective jacket 40 extends along the entire length of the heated hose 100. By covering the fixed heating conductors 30 and braided support web 20, the protective jacket 40 further secures the heating conductors 30 at fixed locations while the heated hose 100 is in use. As such, the protective jacket 40 preferably comprises a flexible, resilient and smooth composition. The thickness of the protective jacket 40 is sufficient to withstand common operational handling, for example, having a protective jacket 40 of 0.3 mm wall thickness, and other thicknesses that vary depending on the insulation properties of the material used therein, and/or mandated requirements of the laws, regulations, technical standards and approval agencies of particular countries or international agreements. Representative materials useful in forming the protective jacket 40 include types of materials such as TPE, PO, fluoropolymer, and/or silicone. The protective jacket 40 may be solid, foam, or a combination of solid and foam. Representative foam components 42 include for example, without limitation, silicone, thermoplastic polyurethane (TPU) and polyvinyl chloride (PVC), and combinations thereof, with compositions of silicone and thermoplastic polyurethane (TPU) preferred. The foam component 42 is particularly useful for applications of the heated hose 100 for high temperature heating, for heating temperature sensitive liquids that require even temperature distribution along the length of the heated hose 100, or within environments such as automotive applications and other production equipment, where the foam component 42 provides the function of highly flexible and robust utility.

In given applications, it is preferred to include a reinforcement braiding 44 in addition to the protective jacket 40 of the heated hose 100. This addition of this braided layer provides for additional resistance to increases in pressure within the inner hose 10, for example, to increase the pressure drag, or pressure rating, of the system. Representative compositions of the exterior reinforcement braiding 44 include for example, without limitation, materials of stainless steel, glass fiber, KEVLAR®, and polyester. Additional layers may be added for particular purposes, such as an additional foil or film layer 46 underneath or encompassing the reinforcement braiding 44. In one embodiment, a film layer 46, such as polyester or polyamide tape, may be incorporated underneath the reinforcement braiding 44 to increase the flexibility of the finished product for application with extreme movements during processing. Representative polyamide tapes include those tapes provided under the KAPTON® trademark, sold by E.I. DuPont de Nemours and Company Corporation of Wilmington, Del. Alternatively, a foil layer 46, such as copper or aluminum, may be incorporated underneath the reinforcement braiding 44 to increase the resilience of the finished product for application within harsh environments. Typically, the foil or film layer 46 may be applied in multiple sheets or wraps of material to provide a desired degree of durability.

The heated hose 100 may further include other appropriate outer layers to provide mechanical protection, electrical protection and/or thermal insulation, including for example, an outer jacket. Supports, protective conduits and other such positioning devices may be used to facilitate the placement of the heated hose 100 in a particular environment.

Figure 8:
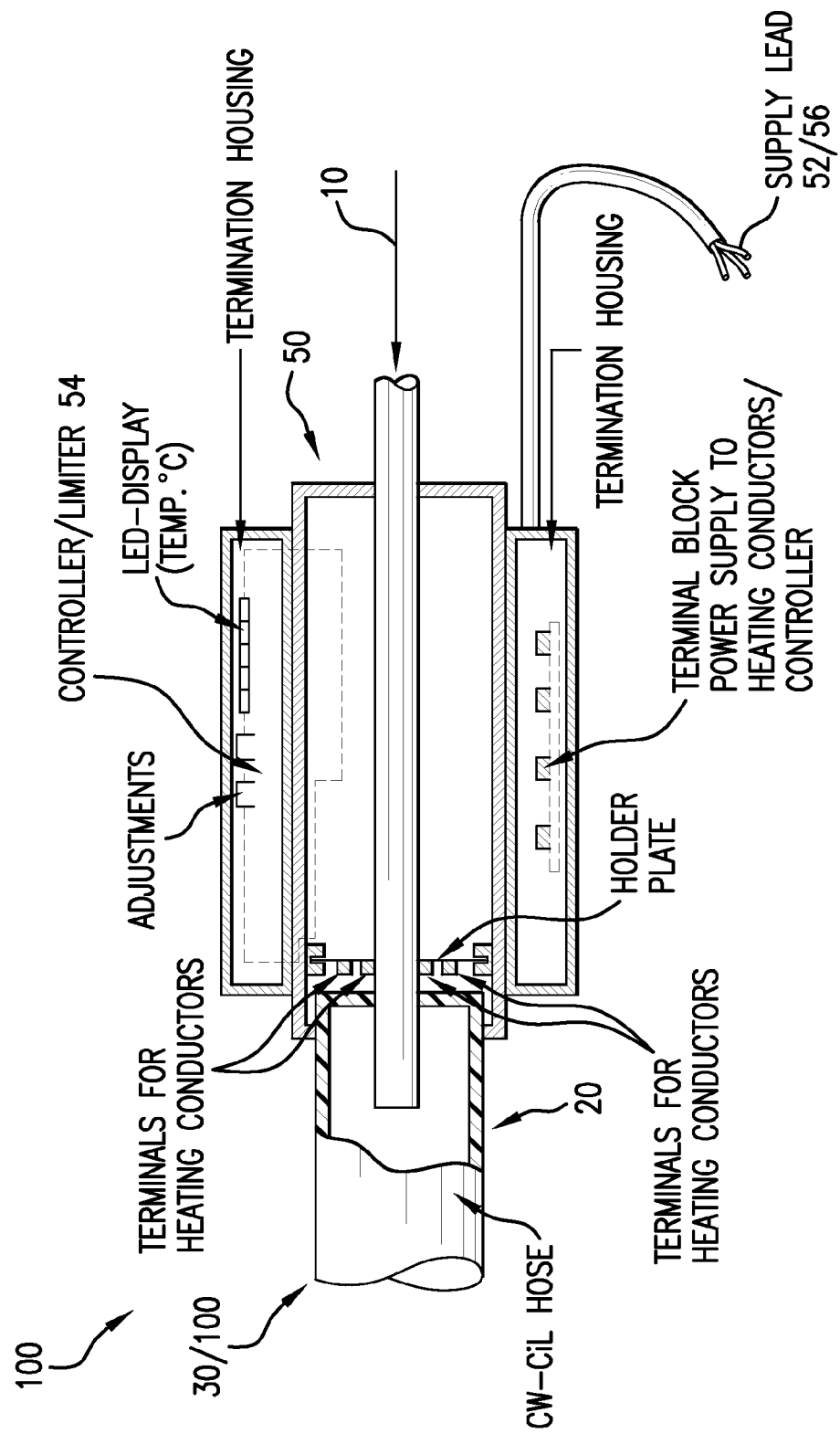
FIG. 8 is an illustration showing a termination of the heated hose of the present invention; and, FIG. 9 is an illustration showing an end cap of the heated hose of the present invention.
Figure 9:
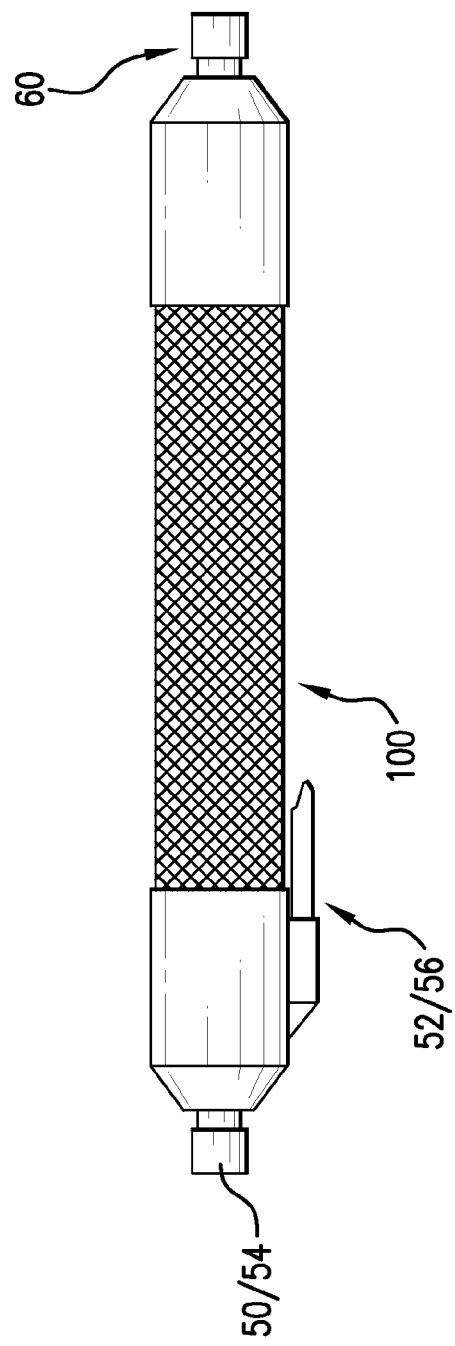

As seen in FIGS. 8 and 9, once cut to length, the heated hose 100 may include a termination 50 and/or end cap 60. Referring to FIGS. 8 and 9, a length of inner hose 10, covered by the braided support web 20 is powered by a power supply 52 through a supply lead 56 within the termination 50. The termination 50 preferably includes a controller and/or limiter 54 for regulating the power supply 52. The supply lead 56 is connected to a terminal block 58 which, in turn, is electrically connected to the heating conductors 30, held in place within the termination 50 through a holder plate. A display, such as an LED display, may be present on the termination 50. An end cap 60 is placed at the opposite end of the heated hose 100 to complete an electrical circuit through the terminal block between two or more distinct heating conductors 30 within the heated hose 100. Additionally, temperature sensors are preferably incorporated into the heated hose 100. When present, the temperature sensor or power controller provides a high level of flexibility for a broad range of uses for a particularly designed heated hose 100. Soft and/or hard end caps are preferably integrated with the temperature sensor/power controller or temperature controller/temperature limiter. End caps can be installed on various designs of the heated hose 100, which are made from an "endless" heated hose base material produced by the herein described manufacturing process.

Markings may be included within the outer layer of the heated hose 100. For example, the outside of the heated hose, outer jacket and/or one or more strands of the braided web support 20, may be colored to indicate resistance of a particular heated hose 100. Combinations of colors or other marking may be used to indicate different parameters of the heated hose 100, e.g., colors that indicate minimum or maximum resistances, adverse environmental use, etc. Marking may be applied by any appropriate device or process, with markings applied using laser printing techniques particularly preferred.

Various construction options of the heated hose 100, allow the heated hose 100 of the present invention to be designed for particular use in both hostile and benign environmental areas. With the application of various additional layers, or the removal of such layers, the construction of the heated hose 100 may be particularly designed to fulfill the technical needs of a particular environment and/or use. For example, in restricted areas mandating specified insulation thicknesses, distances between conductive parts, and other like operational considerations, the presently described heated hose 100 ensures a degree of flexibility in allowing suitable construction for a given use while retaining constant and reliable heating of the fluid being conducted.

Manufacture of the heated hose 100 includes a process to produce an "endless" heated hose base material. Such process includes a continuous extrusion of the inner hose 10 that, once properly cooled, is combined with the braided support web 20/heating conductors 30 braided thereon. In one embodiment, the inner hose 10 forms an in-line component of the manufacturing process allowing for the cooled formed inner hose 10 to enter the braiding step in a continuous process. In an alternative methodology, individual segments of the cooled formed inner hose 10 are advanced into the braiding step in a batch processing of the heated hose 100. Once the inner hose 10 has entered the braiding step of the manufacturing process, spools of braiding material and heating conductor 30 are wrapped or weaved about the exterior of the inner hose 10 to form a braided support web 20 fixing the heating conductors 30 either within the braided support web 20 or underneath the braided support web 20. Application of the protective jacket 40 may be fixed to the exterior of the braided support web 20 using solid sheets of moldable material that are wrapped around the exterior of the braided support web 20, and optionally effectively heated to collapse and adhere the material. Alternatively extruded material may be used as a covering along the length of the inner hose 10. Additional manufacturing steps may be included, as desired for particular heated hose 100 configurations, such as wrapping and/or weaving spools of braiding material on the exterior of the protective jacket 40 to create a second web structure on the inner hose 10 in the form of the reinforcement braiding 44. Foam material, film or foil may be placed around the exterior of the protective jacket 40 prior to this weaving step to create an additional foam layer, film layer and/or foil layer. Manufacture of the heated hose 100 may occur in long lengths that are then placed on reels for shipping.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A heated hose, comprising:
   an inner hose;
   a braided support web encompassing the inner hose;
   at least one heating conductor fixed by the web against the inner hose; and a protective jacket covering the fixed heating conductor and web,
further comprising a variable heating conductor connector, wherein the variable heating conductor connector selectively energizes individual heating conductors.

2. The heated hose of claim 1, wherein the at least one heating conductor is covered by the braided support web.

3. The heated hose of claim 1, wherein the at least one heating conductor is interwoven within the braided support web.

4. The heated hose of claim 1, wherein the inner hose comprises a flexible composition selected from the group consisting of TPEE, TPE, TPD, TPO, TPV, PO, fluoropolymer, silicone and combinations and mixtures thereof.

5. The heated hose of claim 4, wherein the inner hose comprises TPEE.

6. The heated hose of claim 1, wherein the braided support comprises a composition selected from the group consisting of polyester, glass fiber, carbon fibers, textile filaments, KEVLAR®, and combinations and mixtures thereof.

7. The heated hose of claim 1, wherein the braided support web covers from about 20% to about 100% of the outer surface area of the inner hose.

8. The heated hose of claim 7, wherein the braided support web covers from about 50% to about 70% of the outer surface area of the inner hose.

9. The heated hose of claim 2, wherein the at least one heating conductor includes an electrically insulating coating.

10. The heated hose of claim 3, wherein the at least one heating conductor includes an electrically insulating coating.

11. The heated hose of claim 9, wherein from about 2 to about 6 heating conductors are present.

12. The heated hose of claim 1, wherein the heating conductors have a configuration selected from the group consisting of round profiles, flat profiles, and combinations thereof.

13. The heated hose of claim 1, wherein the protective jacket comprises a flexible composition.

14. The heated hose of claim 1, wherein the protective jacket covering includes a foam component.

15. The heated hose of claim 1, further comprising a reinforcement braiding exterior to the protective jacket.

16. The heated hose of claim 15, further comprising a film layer encompassing the reinforcement braiding exterior.

17. The heated hose of claim 10, wherein from about 2 to about 6 heating conductors are present.

18. The heated hose of claim 1,
wherein at least two of the multiple separate heating conductors have distinct heating capabilities.

19. The heated hose of claim 1,
wherein at least two of the multiple separate heating conductors have different resistance values.

20. A heated hose, comprising:
an inner hose;
a braided support web encompassing the inner hose;
at least one heating conductor fixed by the web against the inner hose; and
a protective jacket covering the fixed heating conductor and web,
wherein the at least one heating conductor is covered by the braided support web,
wherein the at least one conductor includes an electrically insulating covering,
wherein at least two of the multiple separate heating conductors have distinct heating capabilities.

21. The heated hose of claim 20,
wherein at least two of the multiple separate heating conductors have different resistance values.

22. The heated hose of claim 20,
further comprising a variable heating conductor connector, wherein the variable heating conductor connector selectively energizes individual heating conductors.

23. A heated hose, comprising:
an inner hose;
a braided support web encompassing the inner hose;
at least one heating conductor fixed by the web against the inner hose; and
a protective jacket covering the fixed heating conductor and web,
wherein at least two of the multiple separate heating conductors have different resistance values.

24. The heated hose of claim 23, further comprising a variable heating conductor connector.

25. The heated hose of claim 23,
wherein at least two of the multiple separate heating conductors have distinct heating capabilities.

26. The heated hose of claim 23,
further comprising a variable heating conductor connector, wherein the variable heating conductor connector selectively energizes individual heating conductors.

27. A heated hose, comprising:
an inner hose;
a braided support web encompassing the inner hose;
at least one heating conductor fixed by the web against the inner hose; and
a protective jacket covering the fixed heating conductor and web,
wherein the at least one heating conductor is interwoven within the braided support web,
wherein the at least one heating conductor includes an electrical) insulating covering,
wherein at least two of the multiple separate heating conductors have distinct heating capabilities.

28. The heated hose of claim 27,
wherein at least two of the multiple separate heating conductors have different resistance values.

29. The heated hose of claim 27,
further comprising a variable heating conductor connector, wherein the variable heating conductor connector selectively energizes individual heating conductors.

* * * * *